Patented Feb. 27, 1951

2,543,419

UNITED STATES PATENT OFFICE 2,543,419

POLYCYCLIC DI-EPOXY ETHERS

Warren D. Niederhauser, Philadelphia, Pa., assignor to Rohm & Haas Company, Philadelphia, Pa., a corporation of Delaware No Drawing. Application May 11, 1949,
Serial No. 92,735

4 Claims. (Cl. 260—348)

1

This invention relates to epoxides of glycol bis-exo-dihydrodicyclopentadienyl ethers and to their preparation. More particularly it relates to epoxides which have the general formula:

$$O' = C_{10}H_{13} - O - R - O - C_{10}H_{13} = O'$$

in which $=C_{10}H_{13}=$ is the radical of exo-dihydrodicyclopentadiene, the two O' groups are oxygen atoms which together with two adjacent carbon atoms in the $=C_{10}H_{13}=$ radicals form oxirane rings, and R is either (a) an alkylene group of 2 to 12 carbon atoms or (b) a radical of an etherified polyalkylene glycol, which radical has the formula $(R'-O-)_xR'$ in which R' is an alkylene group of 2 to 4 carbon atoms and $x$ is an integer having a value of 1 to 8 inclusive.

These epoxidized ethers have the following structural formula which will aid in understanding the nature of the compounds:

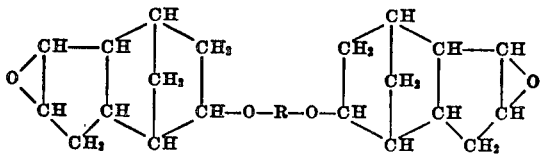

in which R is the radical of a glycol, HO·R·OH, such as ethylene glycol, or of a polyalkylene glycol, HO—R'—O—R'—OH, such as diethylene glycol. These compounds have the unusual property of reacting with glycols in the presence of a catalyst, such as boron trifluoride, to form resins which have the general appearance of polystyrene and which can be molded or cast in the form of large masses, such as blocks or sheets, without undergoing the shrinkage which characterizes the polymerization of styrene. Furthermore, the resins can be made in a linear, thermoplastic form or in a cross-linked, thermoset form and their formation is not inhibited by air, as may occur in the preparation of the polymers of acrylic acid esters for example.

The products of this invention are made by epoxidizing symmetrical ethers of dicyclopentadiene and a glycol, HO·R·OH, in which R has the significance set forth above. These intermediate ethers are known and are obtained by reacting an aliphatic dihydric alcohol with at least two molecular equivalents of dicyclopentadiene in the presence of an acidic condensing agent as catalyst according to the process of U. S. Patent No. 2,393,610 to Bruson. Suitable catalysts are boron trifluoride, sulfuric acid, aromatic sulfonic acids, aluminum chloride, and the like. Although there was originally some doubt as to the exact structure of these intermediate ethers, sub-

2 sequent study has established the fact that they have the following general formula:

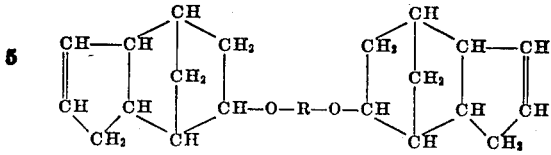

and they are properly called glycol bis-exo-dihydrodicyclopentadienyl ethers, since the etherified glycol residue joins two exo-dihydrodicyclopentadienyl radicals having the empirical formula, $C_{10}H_{13}$—.

The intermediate ethers are epoxidized by reaction with aliphatic peracids, such as performic and peracetic acids, with hydrogen peroxide under acidic conditions, or with aromatic peracids, such as perbenzoic or monoperphthalic acid. Since each mole of hydrogen peroxide or peracid provides one atom of oxygen, it is, of course, necessary to react 2 moles of these epoxidizing compounds per mole of the exo-dihydrodicyclopentadienyl ether. A slight excess, of the order of ten to twenty per cent, of the peracid is often helpful in speeding and completing the epoxidation reaction; but there does not appear to be any advantage in employing more and, in fact, any excess of the peracids tends to give rise to the formation of dihydroxy and/or hydroxyalkoxy or hydroxy-aryloxy derivatives of the ethers at the expense of the diepoxy compound. Peracids per se can be used or they can be prepared in situ during the reaction from the acids and hydrogen peroxide. A particularly satisfactory process of epoxidation is that one in which hydrogen peroxide and formic acid are employed in the ratio of 2 to 4 moles of hydrogen peroxide and 0.5 to 2.0 or preferably 0.5 to 1.5 moles of formic acid for each mole of the exo-dihydrodicyclopentadienyl ether.

The epoxidation reaction is carried out most conveniently and safely at relatively low temperatures, for example, within the range of about 10° C. to 90° C. and preferably from 20° C. to 50° C. Under these conditions, commercial batches of ether are substantially completely epoxidized within a few hours. Agitation facilitates the reaction and is most certainly recommended.

The following examples serve to illustrate how the products of this application can be made.

*Example 1*

A mixture of 1,500 grams of peracetic acid solution (40% peracetic acid in acetic acid) and 75.1 grams of sodium acetate was placed in a three-necked flask equipped with a mechanical stirrer, a thermometer, reflux condenser and dropping funnel. A thousand grams of ethylene glycol bis-exo-dihydrodicyclopentadienyl ether of the formula

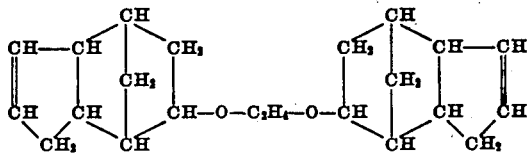

was added dropwise over a period of 40 minutes while the temperature of the mixture was maintained at 40° C. It was necessary to cool the contents of the flask during the addition of the ether, since the reaction which takes place is strongly exothermic. After all of the ether had been added, the mixture was stirred at 40° C. for three hours. Thereafter the reaction mixture was diluted with 800 grams of carbon tetrachloride and the acetic acid was removed by extraction with water. The product was then dried at 100° C. under a pressure of 10 mm. and there was obtained 1,079 grams of a pale yellow, thick oil having a viscosity of about 10,000 centipoises at 25° C. On standing, the product solidified to a waxy solid which was recrystallized first from hexane and then from methanol. The final product melted at approximately 135° C. and distilled without decomposition at 240–250° C. at 1 mm. of pressure. Analysis showed it to have a molecular weight of 357 by the ebullioscopic method in acetone and an oxirane-oxygen content of 8.73% as against a calculated molecular weight of 358.4 and a calculated oxirane-oxygen content of 8.94% for the compound having the formula

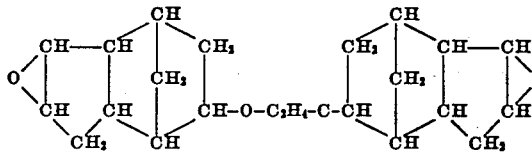

*Exmple 2*

In a manner similar to that described in Example 1, 75 grams of peracetic acid solution (40% in acetic acid) and 3.8 grams of sodium acetate was stirred and maintained at 40° C. while there was gradually added thereto 50 grams of diethylene glycol bis-exo-dihydrodicyclopentadienyl ether of the formula

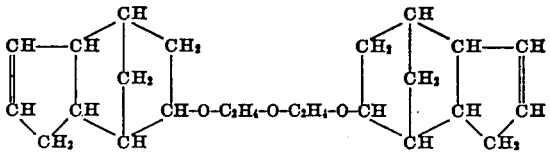

The mixture was stirred at 40° C. for three hours, diluted with 40 grams of carbon tetrachloride and extracted with water to remove acetic acid therefrom. It was then dried under reduced pressure and yielded 43.5 grams of the di-epoxide of diethylene glycol bis-exo-dihydrodicyclopentadienyl ether having the formula

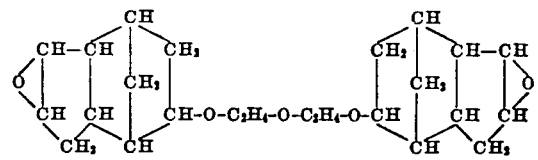

*Example 3*

The same equipment and identical procedure described in Example 2 was used in the epoxidation of 1,3-propylene glycol bis-exo-dihydrodicyclopentadienyl ether. The product weighed 42 grams and contained 7.4% oxirane oxygen which represents an 86% conversion of the ether to the di-epoxide having the formula

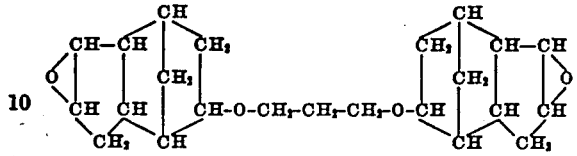

The di-epoxide of the ether of exo-dihydrodicyclopentadienyl ether of 1,2-propylene glycol was prepared in identical manner.

While the above examples are merely illustrative and are limited to the epoxidation of the ethers of dicyclopentadiene and relatively simple glycols, it is understood that ethers of dicyclopentadiene and other glycols are also readily epoxidized by the same method as well as with the use of other peracids, such as performic, perbenzoic, monoperphthalic acids, in place of the peracetic acid. Thus, the above method is applicable to the epoxidation of the ethers of dicyclopentadiene and other glycols typified by the isomeric butylene glycols, hexamethylene glycols and its branched-chained isomers, such as 1,2-dihydroxyhexane, octylene glycols, such as 1,2-dihydroxyoctane and 1,8-dihydroxyoctane, triethylene glycol, tetrapropylene glycols, dibutylene glycols, hexabutylene glycols and octaethylene glycols.

I claim:

1. A di-epoxide of a glycol bis-exo-dihydrodicyclopentadienyl ether which has the formula

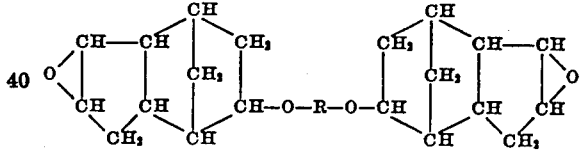

in which R is a member of the class consisting of (a) alkylene groups containing 2 to 12 carbon atoms, and (b) groups of the general formula (R'—O—)$_x$R' in which R' is an alkylene group of 2 to 4 carbon atoms and $x$ is an integer having a value of 1 to 8 inclusive.

2. A di-epoxide having the formula

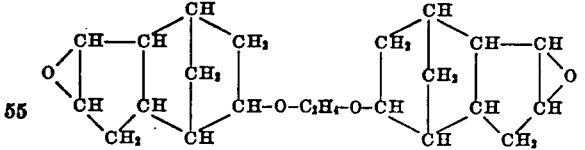

3. A di-epoxide having the formula

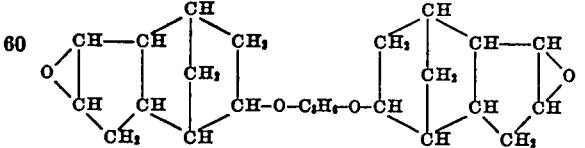

4. A di-epoxide having the formula

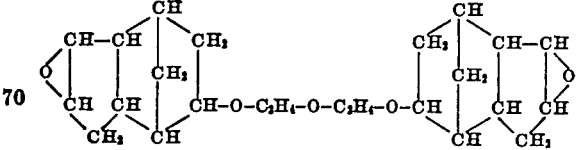

WARREN D. NIEDERHAUSER.

(References on following page)

REFERENCES CITED

The following references are of record in the file of this patent:

UNITED STATES PATENTS

| Number | Name | Date |
|---|---|---|
| 1,970,578 | Schoeller et al. | Aug. 21, 1934 |
| 2,393,610 | Bruson | Jan. 29, 1946 |

OTHER REFERENCES

Gilman: Organic Chemistry, An Advanced Treatise, vol. 1, 2nd edition, page 634 (1954), John Wiley and Sons, Inc., New York.

Elsevier's Encyclopedia of Organic Chem., Series III, vol. 13, (1946) p. 1020.